March 6, 1962 H. L. BISHOP 3,023,700
METHOD OF MAKING ELECTROTYPE PLATES
Filed May 5, 1958
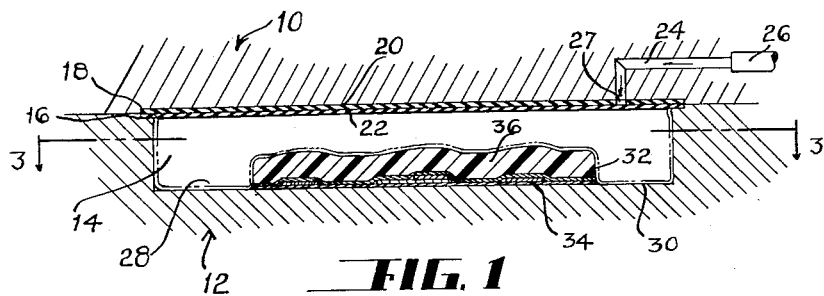
FIG. 1
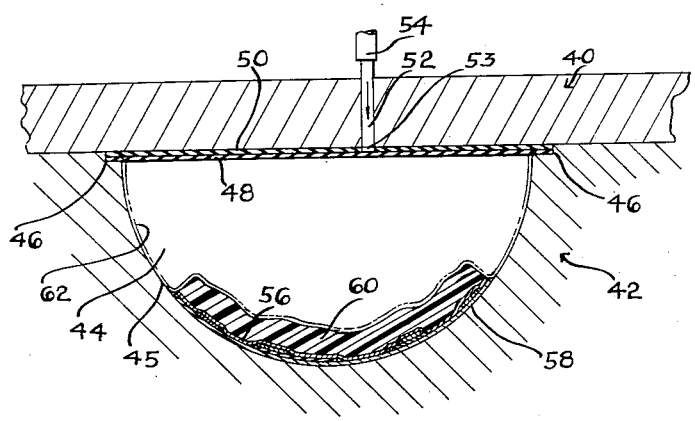
FIG. 2
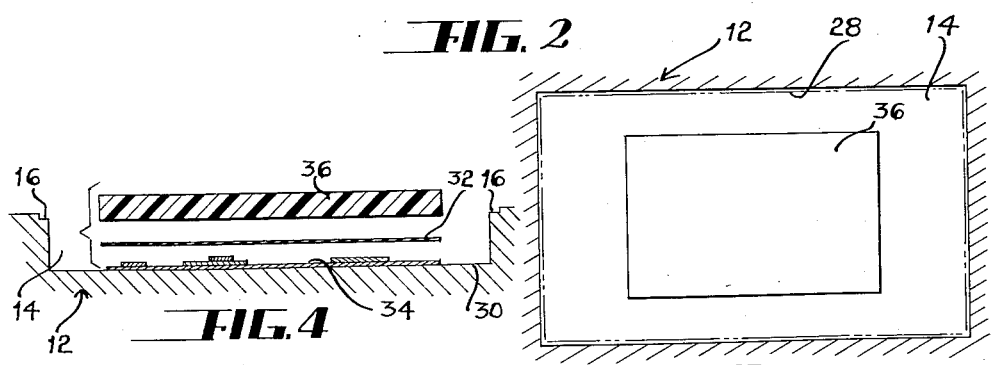
FIG. 4
FIG. 3
INVENTOR.
HOMER L. BISHOP
BY 
HIS ATTORNEYS

United States Patent Office 3,023,700
Patented Mar. 6, 1962

3,023,700
METHOD OF MAKING ELECTROTYPE PLATES
Homer L. Bishop, Kettering, Ohio, assignor to Bista, Inc., West Carrollton, Ohio, a corporation of Ohio
Filed May 5, 1958, Ser. No. 733,126
3 Claims. (Cl. 101—401.1)

This invention relates to a method and apparatus for making electrotype plates and more particularly to a method and apparatus for applying a plastic backing layer to a metallic electrotype shell, however, the invention is not necessarily so limited.

An object of the present invention is the provision of apparatus, including a mold having an inflatable bladder therein, for applying uniform hydrostatic pressure to a plastic body.

Another object of this invention is to use an inflatable bladder and a smooth bed to form a mold cavity preventing the plastic from flowing outwardly over the entire area of the smooth bed.

Another object of this invention is the provision of a method for utilizing the foregoing apparatus in the fabrication of plastic backed electrotype plates.

Still another object of the present invention is the provision of a method and apparatus for applying a plastic backing layer to a metallic electrotype shell while simultaneously treating the image of the electrotype shell to emphasize highlights.

Other objects and advantages reside in the construction of parts, the combination thereof, the mode of operation and the method of manufacture, as will become more apparent from the following description.

In the drawing,

FIGURE 1 is a fragmentary sectional view of the apparatus of this invention illustrating one step in the method of this invention.

FIGURE 2 is an analogous fragmentary sectional view illustrating a modification.

FIGURE 3 is a sectional view, taken substantially along the line 3—3 of FIGURE 1.

FIGURE 4 is a sectional view of a portion of the apparatus of FIGURE 1 illustrating the components of an electrotype plate in exploded detail.

Referring to the drawings in greater detail, the reference numerals 10 and 12 in FIGURE 1 designate mated mold elements. The lower mold element 12 is provided with a rectangular cavity 14, with the margins of this cavity along the upper surface of the mold element 12 being offset as illustrated at 16. The upper mold element 10 is provided with a recess 18 in the lower surface thereof coextensive with the offset marginal portions 16 in the lower mold element 12.

A resilient membrane 20 fills the recess 18 of the upper mold element 10. A like resilient membrane 22 having its margins seated in the offset portion 16 of the lower mold element 12 covers the cavity 14 therein. The construction and arrangement is such that, when the mold elements 10 and 12 are brought together in contacting relation, the margins of the membranes 20 and 22 are pressed together to form an air tight space therebetween. While not illustrated, the margins of the membranes 20 and 22 may be bonded together so as to form a bladder.

Provision is made for the introduction of a fluid under pressure into the space between the membranes 20 and 22. To this end a conduit 24 is provided in the body of the upper mold element 10. A hose fitting connected to this conduit 24 is illustrated schematically at 26. The conduit communicates with the space between the membranes 20 and 22 through a port 27 in the membrane 20.

A suitable door, not illustrated, at one end of the lower mold element 12 provides access to the cavity 14. The arrangement is such that an assembly which is to be subjected to pressure may be inserted in the cavity 14 and thereafter a fluid under pressure may be introduced into the space between the membranes 20 and 22 to force the membrane 22 into the cavity 14 to apply pressure to the assembly therein. To provide for free expansion of the membrane 22 into the cavity 14, the door leading to this cavity is loose fitting, allowing air to move into and out of the cavity 14 in response to the contraction and expansion of the membrane 22.

A door for the mold cavity has been disclosed in my copending application for United States Letters Patent Serial No. 589,762 filed June 6, 1956, for Apparatus and Method of Molding Plates (now abandoned).

FIGURE 4 illustrates the assembly which is placed in the mold cavity 14 for the purpose of making electrotype plates. The reference numeral 32 designates a thin copper electrotype shell of the conventional type which contains an image in relief. The reference numeral 34 designates a make-ready mat of the type disclosed in my United States Letters Patent No. 2,256,921 entitled Make-Ready. The thickness of this mat has been greatly exaggerated in the illustrations. The mat 34 comprises three superimposed layers or sheets, areas of which have been cut away to provide a relief image corresponding to the image of the electrotype shell 32. The number of layers may be more or less than three. The preparation and use of the make-ready mat for the purpose of emphasizing highlights is described in the above identified patent. The reference numeral 36 designates a plastic backing layer which is to be applied to the electrotype shell. The backing layer 36 is preferably a thermoplastic such as vinyl plastic.

The mold cavity 14 is charged with the make-ready mat 34, the electrotype shell 32 and the plastic backing layer 36 as follows. The make-ready mat 34, cut to provide the desired relief image thereon, is laid face up on the flat base surface 30 of the cavity 14. The electrotype shell 32 is superimposed face down on the make-ready mat in accurate registry therewith. If desired, a suitable adhesive may be applied to the back surface of the electrotype shell to aid in bonding the backing layer 36 to the electrotype shell 32. Instead of adhesive, metallic bonds may be used. In my copending applications for United States Letters Patent Serial No. 563,559 filed February 6, 1956, for Electrotype Plate, Method and Apparatus for Making Same (now abandoned) and Serial No. 673,251 filed July 22, 1957, for Electrotype Plate, Method and Apparatus for Making Same (now abandoned), metallic bonds for securing the shell to plastic backing material have been disclosed.

The plastic backing layer 36 is first preheated to a softened condition, then superimposed on the back surface of the electrotype shell 32. Vinyl plastics are in a usefully softened condition for the present purposes in the temperature range 250–450° F., however, best results are obtained with the present method and apparatus when the vinyl plastic backing layer is preheated to a temperature in the range 300–350° F. The shell may also be preheated to the same temperature as the plastic. As best illustrated in FIGURE 3, the superimposed layers 32, 34 and 36 are centered in the cavity 14 in spaced relation to the side walls thereof, the cavity 14 being considerably larger in area than the area of the electrotype plate which is being fabricated.

Before the backing layer 36 has had an opportunity to cool and solidify, the door to the cavity 14 is closed and fluid under pressure is introduced through the conduit 24 between the membranes 20 and 22. The fluid pressure forces the membrane 22 into the cavity 14, this membrane stretching to engage the side walls and the base or bed 30 of the cavity 14, as illustrated in broken line detail designated by the reference numeral 28. When the backing layer 36 is a vinyl plastic heated to a temperature of 300–350° F., the fluid pressure applied to the membrane 22 is preferably in the range of 200–300 lbs. per square inch.

As illustrated, the membrane 22, when stretched to the expanded position illustrated at 28, wraps around the back and sides of the electrotype plate assembly in the mold cavity 14 pressing this assembly against the flat base 30 of the cavity 14. That is, the membrane 22 cooperates with the base or bed 30 to form a mold cavity confining the plastic therein. The membrane 22 contacting the sides of the plastic eliminates the necessity of providing a mold cavity having sides coextensive with the outer margins of the plastic. The backing layer 36 which is in a soft flowing state is thereby forced into intimate contact with the back surface of the electrotype shell 32. The membrane 22, being flexible, applies a substantially hydrostatic pressure to the backing layer 36. That is, the pressure against the backing layer 36 is everywhere substantially equal. As a consequence, there is no tendency for the softened plastic to flow out of the cavity formed by the membrane 22. Thus, it is apparent that the forces tending to drive the softened plastic backing layer 36 under the membrane 22 where it engages the base 30 of the cavity 14 are just counterbalanced by the force of the fluid behind the membrane 22 pushing against the base 30. Similarly, the forces tending to drive the softened plastic under the electrotype shell 32, or under the make-ready mat 34, are counterbalanced by the forces pressing these components against the base 30.

In addition to forcing the backing layer 36 into intimate contact with the rear surface of the electrotype shell 32, the pressure applied through the membrane 22 causes the electrotype shell 32 to move into intimate contact with the make-ready mat 34, thereby transferring the relief image of the mat 34 to the electrotype shell 32. Since the pressure exerted against the backing layer 36 is essentially hydrostatic, the relief image of the make-ready mat 34 will be reproduced to a slight degree in the back surface of the backing layer 36, as illustrated in the drawings. It is to be understood, of course, that use of the make-ready mat 34 is optional, it being possible to practice the present invention insofar as it relates to the application of a plastic backing layer to a metallic electrotype shell without the use of a make-ready mat.

The pressure applied to the backing layer 36 is maintained until this backing layer has cooled to a substantially rigid condition. Thereafter, the pressure is released and the electrotype plate removed from the mold cavity 14. The electrotype plate is then ready for the shaving and trimming operations conventionally performed with ordinary lead backed electrotype plates. That is, the back surface of the backing layer 36 is shaved smooth to the correct thickness, and the margins of the electrotype plate are trimmed to the correct dimensions.

For some purposes it may be desirable to pass the flat electrotype plates together with the make-ready mat through the Consoleveler, as disclosed in my Patent No. 2,580,723 issued January 1, 1954, before being shaved and trimmed. This is done to emphasize the make-ready treatment in the face of the flat plate.

FIGURE 2 illustrates a mold assembly for making curved electrotype plates. This mold assembly comprises upper and lower mold elements 40 and 42. The mold element 42 is provided with a smooth concave surface 45 providing a semicylindrical cavity 44 between the mold elements 40 and 42. The margins of mold element 42 along the upper surface thereof adjacent the cavity 44 are offset as illustrated at 46 in FIGURE 2 for the receipt of resilient membranes 48 and 50 which cooperate to form a bladder between the mold elements 40 and 42. The arrangement is such that when the mold elements 40 and 42 are assembled together, as illustrated in FIGURE 2, the margins of the membranes 48 and 50 are clamped in pressured relation.

A conduit 52 connecting with an aperture 53 in the membrane 50 is provided in the upper mold element 40 for supplying fluid under pressure to the space between the membranes 48 and 50. The conduit 52 is supplied with fluid under pressure through a suitable hose illustrated schematically at 54. As was the case with the apparatus of FIGURE 1, a suitable door, not illustrated, is provided at one end of the semicylindrical cavity 44, affording access to this cavity so that electrotype plate components may be inserted in the mold cavity. The door is made loose fitting to allow the movement of air into and out of the cavity 44.

In the fabrication of curved electrotype plates utilizing the apparatus of FIGURE 2, the electrotype shell 56 is first curved to substantially the shape of the surface 45, either by inserting the shell alone in the cavity 44 and applying pressure with the membrane 48, or with auxiliary equipment. With the shell 56 precurved to the desired shape, a precut make-ready mat 58 is inserted face up on the surface 45 of the mold element 42. The electrotype shell 56 is placed in registration therewith and, finally, a plastic backing layer 60 together with the shell which have been preheated to a softened state of the plastic is laid on the back side of the electrotype shell 56. The softening of the backing layer 60 is such that this layer will drape upon the back side of the electrotype shell 56 and assume the contour thereof. As was the case with the embodiment of FIGURE 1, an adhesive or a metallic bonding material may be applied to the back side of the electrotype shell 56, as desired, for improving the bond between the backing layer 60 and the shell 56.

With the electrotype plate components assembled and centered in the mold cavity 44, which is larger in area than these components, fluid under pressure is introduced between the membranes 48 and 50, forcing the membrane 48 to expand substantially to the dotted line position designated by the reference numeral 62. Hydrostatic pressure is thus applied to the softened backing layer 60 of the electrotype plate to bond the backing layer 60 to the electrotype shell 56, and simultaneously impress upon the electrotype shell 56 a relief image for emphasizing highlights, as described hereinbefore.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A method for molding a thermoplastic backing layer to an electrotype printing shell including the steps of heating the backing layer to soften same, superimposing the backing layer and the printing shell, placing the electrotype shell on a smooth and rigid supporting surface, covering the electrotype shell and the softened backing layer thereon with a resilient membrane having an area exceeding the area of said backing layer whereby portions of said membrane engage said supporting surface, and applying hydrostatic pressure to said membrane to compress said backing layer and said electrotype shell between the membrane and said supporting surface, said membrane cooperating with said supporting surface to confine said plastic layer substantially to its original surface area.

2. The method according to claim 1, including the step of interposing a make-ready mat having a prepared relief image for emphasizing highlights between said electrotype shell and said supporting surface prior to the application of hydrostatic pressure to said membrane.

3. A method for laminating a heat-softened thermoplastic layer to a receiver shell including the steps of superimposing the plastic layer and the receiver shell, placing the receiver shell on a smooth and rigid supporting surface, covering the superimposed receiver shell and the softened plastic layer with a resilient membrane having an area exceeding the area of the plastic layer whereby portions of the membrane engage the supporting surface, and applying hydrostatic pressure to said membrane to compress the plastic layer and the receiver shell between the membrane and the supporting surface, said membrane cooperating with said supporting surface to confine said plastic layer substantially to its original surface area.

References Cited in the file of this patent

UNITED STATES PATENTS

| | | |
|---|---|---|
| 130,140 | Judson | Aug. 6, 1872 |
| 1,177,240 | Gates | Mar. 28, 1916 |
| 1,365,267 | Oakley | Jan. 11, 1921 |
| 1,487,178 | Polleys | Mar. 18, 1924 |
| 1,803,548 | Drake | May 5, 1931 |
| 1,806,861 | Owen | May 26, 1931 |
| 2,045,471 | Kasen | June 23, 1936 |
| 2,280,865 | Stossel | Apr. 28, 1942 |
| 2,363,431 | Moorhouse | Nov. 21, 1944 |
| 2,507,347 | Myers | May 9, 1950 |
| 2,575,734 | Schulman | Nov. 20, 1951 |
| 2,581,718 | Schaffert et al. | Jan. 8, 1952 |
| 2,590,221 | Stevens | Mar. 25, 1952 |